(12) United States Patent
Furukawa et al.

(10) Patent No.: US 9,013,543 B1
(45) Date of Patent: Apr. 21, 2015

(54) DEPTH MAP GENERATION USING MULTIPLE SCANNERS TO MINIMIZE PARALLAX FROM PANORAMIC STITCHED IMAGES

(71) Applicant: Google Inc., Mountain View, CA (US)

(72) Inventors: Yasutaka Furukawa, Bellevue, WA (US); Tarak Gandhi, San Diego, CA (US)

(73) Assignee: Google Inc., Mountain View, CA (US)

( * ) Notice: Subject to any disclaimer, the term of this patent is extended or adjusted under 35 U.S.C. 154(b) by 344 days.

(21) Appl. No.: 13/676,728

(22) Filed: Nov. 14, 2012

(51) Int. Cl.
  *H04N 7/00* (2011.01)
  *H04N 5/232* (2006.01)

(52) U.S. Cl.
  CPC .................. *H04N 5/23238* (2013.01)

(58) Field of Classification Search
  CPC ............ H04N 5/23238; H04N 5/2628; H04N 5/2259; H04N 5/262; H04N 5/272; G06T 3/4038; G06T 3/0018; G02B 13/06; G03B 37/04; G03B 35/00
  USPC ............. 348/36, 38, 39, 42, 47, 48, 239, 584, 348/598; 352/69, 57, 86; 359/725, 504; 382/154; 345/629

IPC ............... H04N 7/00,13/00, 13/02, 5/262, 9/74, H04N 9/76
  See application file for complete search history.

(56) References Cited

U.S. PATENT DOCUMENTS

| | | | |
|---|---|---|---|
| 2007/0159524 A1* | 7/2007 | Kim et al. ........................ | 348/36 |
| 2012/0300020 A1* | 11/2012 | Arth et al. ........................ | 348/36 |
| 2014/0184640 A1* | 7/2014 | Putraya et al. ................. | 345/629 |

* cited by examiner

*Primary Examiner* — Sherrie Hsia
(74) *Attorney, Agent, or Firm* — Lerner, David, Littenberg, Krumholz & Mentlik, LLP

(57) ABSTRACT

Systems, methods and articles of manufacture for minimizing parallax based on depth map generation are described herein. Embodiments of the present disclosure relate to cameras positioned on a camera assembly that capture digital photographic images. The digital photographic images are stitched together into a panoramic image. In order to minimize the parallax while stitching, the procedure includes estimating a distance of a pixel corresponding to a scene point on the scene surface from a panoramic center of projection positioned on the camera assembly to the scene surface. A depth map is generated that provides the estimated depth of the pixel. Based on the estimated depth, the pixel may be projected onto each camera. A panoramic pixel corresponding to the scene point may be obtained from the values of each projected pixel. The panoramic pixel may then be mapped onto the panoramic image with parallax minimized.

20 Claims, 10 Drawing Sheets

DEPTH MAP GENERATION USING MULTIPLE SCANNERS TO MINIMIZE PARALLAX FROM PANORAMIC STITCHED IMAGES

BACKGROUND

Image mosaics are created by merging multiple digital images. For example, a number of images taken inside an office building form a panoramic view of the inside of the office building. Each image may capture a different indoor area of the office building. The individual images of the different areas are merged together to form a comprehensive view of the entire area. For example, to image the inside of a large office building, hundreds of individual images may be required. The process of merging two or more individual images is referred to as "stitching," and the location where two images meet is called a "seam."

The images merged together to form the panoramic view of the inside of the office building are typically captured by several cameras positioned on a common platform. Each of the cameras is positioned on the common platform accordingly to cover a 360 degree field of view of the inside of the office building. Because each camera is positioned in a different location on the common platform, each camera has its own center of projection rather than having a single common center of projection. The distance between the common platform and the walls, floor, ceilings, and objects positioned inside the building is short such that the images generated by the several cameras of the inside of the office building are near-field images.

Stitching artifacts may be generated when near-field images that are captured from different cameras with different centers of projection are stitched together to form the panoramic view of the inside of the office building due to parallax. Parallax refers to a perceived shift of an imaged object against a background caused by the distance between apertures of each camera positioned on the common platform. Existing satellite and some airborne cameras do not have to account for parallax since both the focal length between the cameras and the object being imaged (e.g., the ground) is large enough such that the distance between apertures of each camera is negligible. When the focal length is decreased, such as in near-field imaging and also for airborne cameras in lower flying planes, such as those capturing images of a bird's eye view, stitching artifacts due to parallax becomes a greater issue.

BRIEF SUMMARY

Embodiments of the present disclosure relate to the generation of high-resolution images in a variable depth of field environment. In an embodiment, a method includes estimating the depth (distance) of each pixel corresponding to a scene point on a scene surface. A plurality of scan lines from a ranging device positioned on a camera assembly may be identified by a processing device as the camera assembly is travelling along a travel path, where each scan line has a starting point at the position of the ranging device and an end point at a position of the corresponding scene point on the scene surface. A spherical coordinate system centered at the panoramic center of projection of the panoramic image may be generated by the processing device where the spherical coordinate system may be configured to extend beyond the scene surface based on the plurality of scan lines. The spherical coordinate system may be partitioned by the processing device into a plurality of volumetric pixels. A depth value from a plurality of depth values may be assigned by the processing device to each pixel associated with each volumetric pixel. A location of the scene surface corresponding to the travel path of the camera assembly may be determined by the processing device based on the depth value assigned to each pixel corresponding to each scene point on the scene surface.

In another embodiment, a method includes minimizing parallax from a panoramic image created by stitching together a plurality of digital photographic images captured from a plurality of cameras positioned on a camera assembly. The plurality of digital photographic images taken of a scene surface may be accessed by a processing device where each digital photographic image is configured to be merged with one or more other images of the plurality of digital photographic images to form the panoramic image. A depth of each pixel corresponding to a scene point on the scene surface from a panoramic center of projection positioned on the camera assembly to the scene surface may be estimated by the processing device as the camera assembly is travelling along a travel path. The pixel corresponding to the scene point may be projected onto each camera of the plurality of cameras by the processing device based on the estimated depth of each pixel. A panoramic pixel corresponding to the scene point may be obtained by the processing device from each camera from the plurality of cameras based on a value of each projected pixel that corresponds to the scene point. The panoramic pixel obtained from each camera may be mapped back by the processing device onto the panoramic image.

In another embodiment, a system estimates a depth of each pixel corresponding to a scene point on a scene surface. A scan line identifier may be configured to provide a plurality of scan lines corresponding to a position of each corresponding ranging device as the camera assembly is travelling along a travel path, where each scan line has a starting point at the position of the corresponding ranging device and an end point at a position of the corresponding scene point on the scene surface. A spherical coordinate system generator may be configured to generate a spherical coordinate system that is centered at a panoramic center of projection for the panoramic image, where the spherical coordinate system may be configured to extend beyond the scene surface based on the plurality of scan lines. A partitioning module may be configured to partition the spherical coordinate system into a plurality of volumetric pixels. An assignment module may be configured to assign a depth value from a plurality of depth values to each pixel that is associated with each volumetric pixel. A determining module may be configured to determine a location of the scene surface corresponding to the travel path of the camera assembly based on the depth value assigned to each pixel corresponding to each scene point on the scene surface. Each of the scan line identifier, the spherical coordinate system generator, the partitioning module, and the determining module may be implemented on a processing device.

In another embodiment, a system minimizes parallax from a panoramic image created by stitching together a plurality of digital photographic images captured from a plurality of cameras positioned on a camera assembly. An accessing module may be configured to access the plurality of digital photographic images taken of a scene surface where each digital photographic image is configured to be merged with one or more other images of the plurality of digital photographic images to form the panoramic image. An estimating module may be configured to estimate a depth of each pixel corresponding to a scene point on the scene surface from a panoramic center of projection positioned on the camera assembly to the scene surface as the camera assembly is travelling along a travel path. A projecting module may be configured to project the pixel corresponding to the scene point onto each camera of the plurality of cameras based on the estimated depth of each pixel. An obtaining module may be configured to obtain a panoramic pixel corresponding to the scene point from each camera from the plurality of cameras based on a value of each projected pixel that corresponds to the scene point. A mapping module may be configured to map the panoramic pixel obtained from each camera onto the panoramic image. The accessing module, the estimating module, the projecting module, the obtaining module, and the mapping module may be implemented on a processing device.

Further embodiments, features, and advantages, as well as the structure and operation of the various embodiments, are described in detail below with reference to the accompanying drawings.

BRIEF DESCRIPTION OF THE DRAWINGS/FIGURES

Embodiments are described with reference to the accompanying drawings. In the drawings, like reference numbers may indicate identical or functionally similar elements.

DETAILED DESCRIPTION

A panoramic image of an inside of a building may be created by stitching together digital photographic images captured by cameras positioned on a camera assembly as the camera assembly travels throughout the inside of the building. A depth map may be used to determine a distance from a center of projection for the cameras positioned on the camera assembly to a scene surface. The distance data provided by the depth map may be used to project the scene points corresponding to each pixel in panoramic image to be generated, onto each digital photographic image and use the pixel color from the cameras to render the panoramic pixel. Parallax may be minimized when each pixel is mapped from each digital photographic image to the panoramic image.

In the Detailed Description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic may be described in connection with an embodiment, it may be within the knowledge of one skilled in the art to effect such feature, structure, or characteristic in connection with other embodiments whether or not explicitly described.

Camera Assembly Configuration

Figure 1:
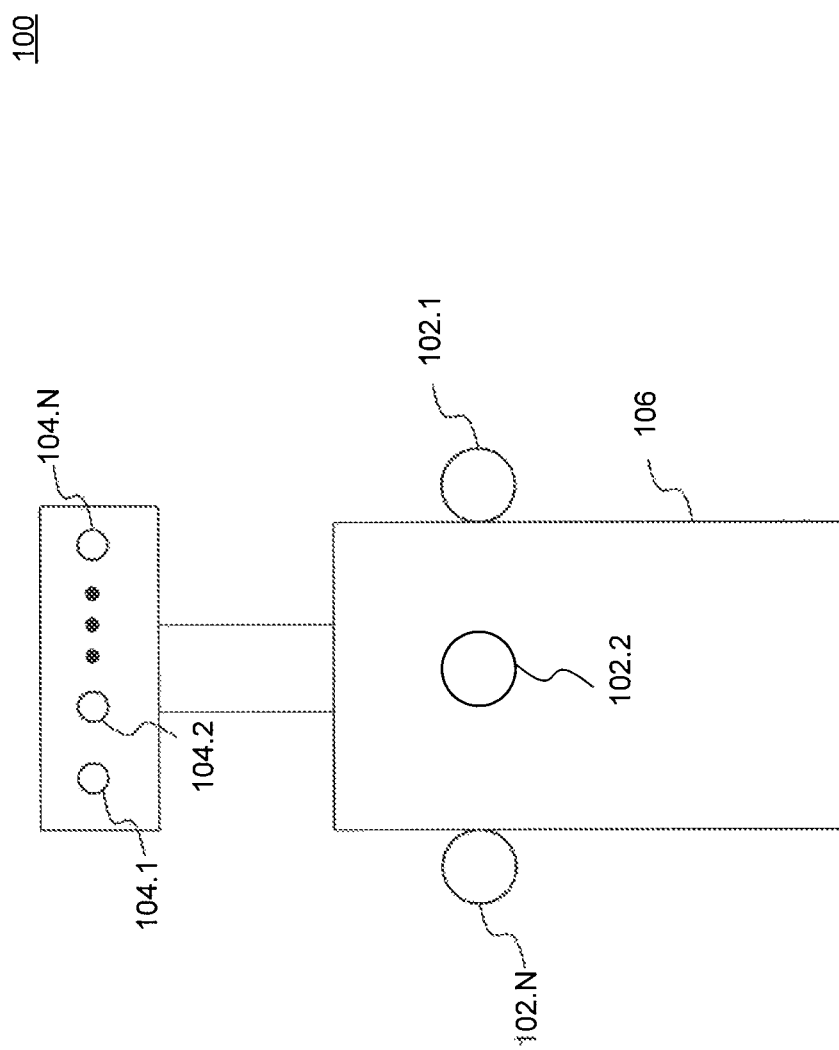
FIG. 1 depicts a camera assembly configuration in which embodiments of the present disclosure, or portions thereof, may be implemented.

FIG. 1 depicts a camera assembly configuration 100. Camera assembly configuration 100 includes a plurality of cameras 104.1 through 104.N, a plurality of scanners 102.1 through 102.N, and a camera assembly 106.

A panoramic image is a wide angle representation of a physical space. A panoramic image of an inside of a building may include a wide angle representation of the inside of the building. A scene surface depicted by the panoramic image of the inside of the building may include walls, floors, ceilings, windows, outdoor scenes located outside the windows, objects positioned inside the building and any other structure and/or object viewed from inside the building that will be apparent to those skilled in the relevant art(s) without departing from the spirit and scope of the present invention.

A panoramic image depicting an inside of a building may be generated by stitching together a plurality of digital photographic images. The panoramic image may capture, for example, a 360 degree view of the inside of the building. Each digital photographic image may capture a portion of the inside of the building so that when stitched together into the panoramic image, the inside of the building is accurately represented by the panoramic image. The plurality of digital photographic images representing the inside of the building may be captured by a plurality of cameras 104.1 through 104.N, where N is an integer equal to or greater than two.

Figure 2:
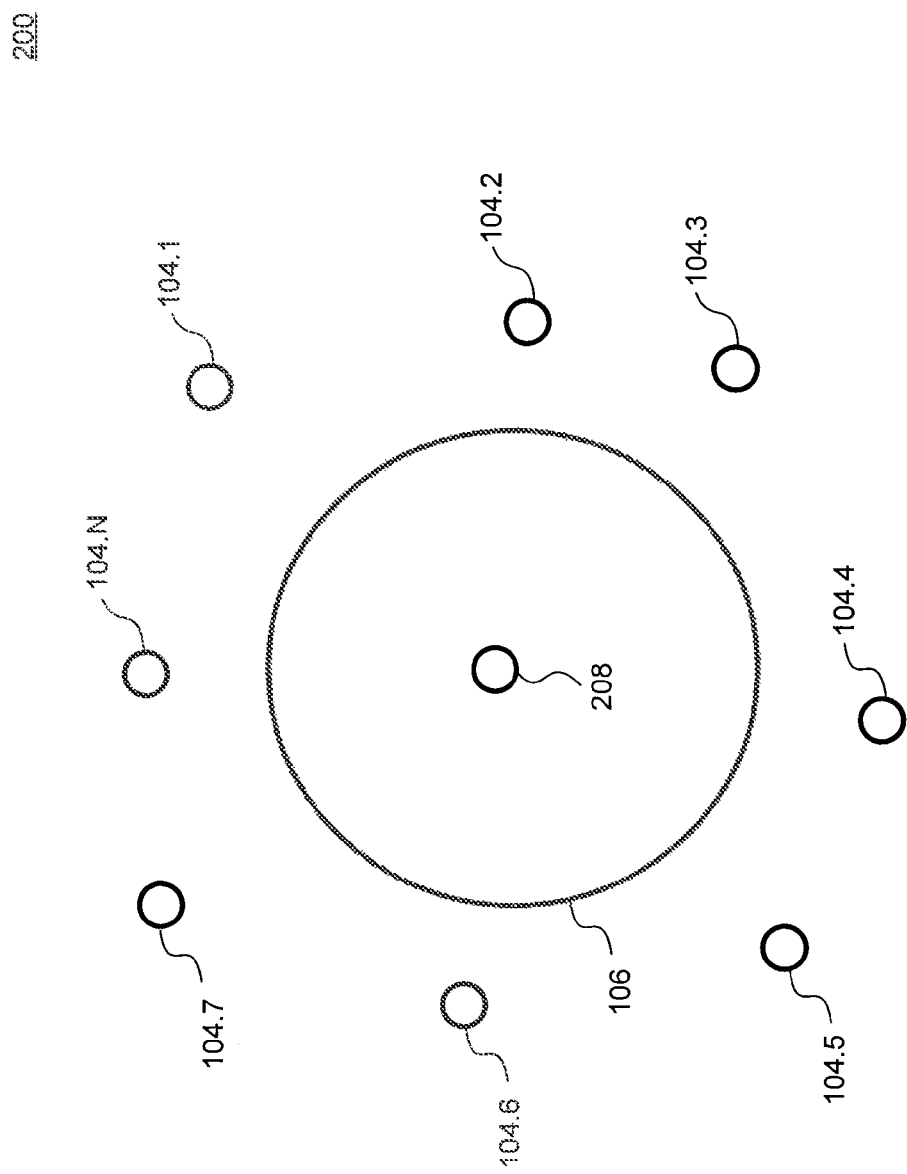
FIG. 2 depicts a camera assembly configuration where each camera is positioned in a different location on a camera assembly to sufficiently capture each portion of the 360 degree field of view which embodiments of the present disclosure, or portions thereof, may be implemented.

Each camera 104.1 through 104.N may be positioned on camera assembly 106 such that each camera 104.1 through 104.N captures a different field of view of the inside of the building. Each field of view may be a portion of the 360 degree field of view of the inside of the building. The plurality of digital photographic images captured by plurality of cameras 104.1 through 104.N may sufficiently represent the 360 degree field of view of the inside of the building when stitched together to form the panoramic image. For example, FIG. 2 depicts a top view 200 of camera assembly configuration 100. The plurality of digital photographic images captured by plurality of cameras 104.1 through 104.N may also represent a partial view of the inside of the building when stitched together to form the panoramic image without departing from the spirit and scope of the present invention.

Camera assembly 106 may travel along a travel path. The travel path may outline a route inside the building such that the inside of the building may be sufficiently captured by plurality of cameras 104.1 through 104.N. Each camera 104.1 through 104.N may capture digital photographic images of the inside of the building as camera assembly 106 travels along the travel path. In an embodiment, each camera 104.1 through 104.N captures enough digital photographic images of the inside of the building so that when each digital photographic image is stitched together into the panoramic image, the 360 degree field view of the inside of the building is accurately represented by the panoramic image.

As noted above and shown in FIG. 2, each camera 104.1 through 104.N may be positioned in a different location on camera assembly 106 to sufficiently capture each portion of the 360 degree field of view of the inside of the office building. Because each camera is positioned in a different location on camera assembly 106, each camera 104.1 through 104.N has its own center of projection rather than having a single common center of projection.

For example, each camera 104.1 through 104.N is positioned around camera assembly 106, where the center of camera assembly 106 is camera assembly center 208. Each camera 104.1 through 104.N has an individual center of projection at its own respective location. For example, camera 104.1 includes a center of projection centered at camera 104.1.

The different centers of projection for each camera 104.1 through 104.N may result in stitching artifacts when the plurality of digital photographic images captured by plurality of cameras 104.1 through 104.N are stitched together to form the panoramic image of the inside of the building. Specifically, the lack of a single common center of projection for each camera 104.1 through 104.N may result in parallax error when the digital photographic images are stitched together to form the panoramic image.

Figure 3:
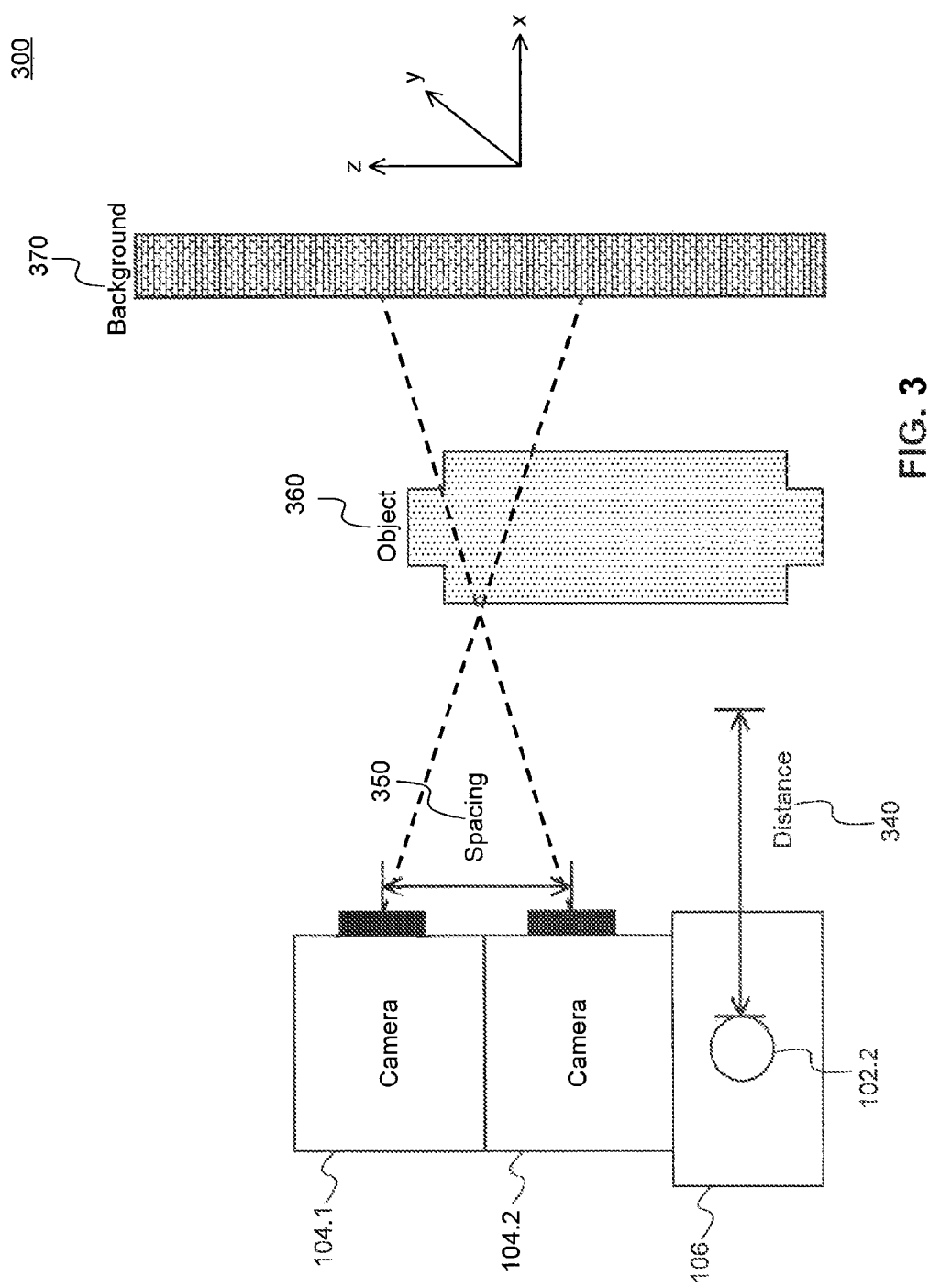
FIG. 3 illustrates two cameras receiving an image of an object with a reference background.

For example, FIG. 3 illustrates camera 104.1 and camera 104.2 receiving an image of an object 360. A spacing 350 between apertures of camera 104.1 and camera 104.2 may cause parallax error due to a perceived shift of the imaged object 360 against a background 370. That is, camera 104.1 may have a different perspective of imaged object 360 than the perspective of camera 104.2, due to the angular position of object 360 as viewed by these cameras.

Referring back to FIG. 1, the effect of parallax may be accounted for by measuring the distance between camera assembly 106 and the scene surface representing the inside of the building. The distance between camera assembly 106 and the scene surface may be measured with plurality of scanners 102.1 through 102.N. An example of a scanner included in plurality of scanners 102.1 through 102.N may be a laser scanner. Alternatively, other types of scanners may be used, such as a sonic detection and ranging device (which uses sound waves for measurement) or a radar device (which uses radio waves for measurement).

Plurality of scanners 102.1 through 102.N may be positioned on camera assembly 106 such that each scanner 102.1 through 102.N measures the distance from camera assembly 106 to the scene surface in a 360 field of view. For example, scanner 102.1 measures the distance of the scene surface to the left of camera assembly 106, scanner 102.2 measures the distance of the scene surface in front of camera assembly 106, and scanner 102.N measures the distance of the scene surface to the right of camera assembly 106. FIG. 3 further illustrates scanner 102.2 measuring a distance 340 between camera assembly 106 and object 360. Object 360 may represent an object located in the scene surface as camera assembly 106 travels along the travel path.

Plurality of scanners 102.1 through 102.N continuously measure the distance of camera assembly 106 from the scene surface as camera assembly 106 travels along the travel path. The effect of parallax can be observed in pixels present in overlap pixel regions. Overlap pixel regions may be formed in the overlap portions of the plurality of digital photographic images, where pixels may be shared by two or more digital photographic images. However, parallax exists even in pixels not present in overlap pixel regions where the pixels are visible only in a single digital photographic image.

The effect of parallax may be accounted for based on the distance data obtained by plurality of scanners 102.1 through 102.N. Pixels may be spatially shifted from a first digital photographic image received by a camera, such as camera 104.1, to form a resulting panoramic image with a spatial relationship uniform to a received second digital photographic image received by a second camera, such as camera 104.2, when the first digital photographic image and the second photographic image are stitched together.

In an embodiment, the distance data obtained by plurality of scanners 102.1 through 102.N may be used to generate a three-dimensional depth map that represents the distance between the camera assembly 106 and various parts of the scene surface as camera assembly 106 travels along the travel path. The three-dimensional depth map may be used to spatially shift pixels in panorama so that each pixel may be properly mapped from each digital photographic image onto the panoramic image to minimize the effect of parallax.

As would be appreciated by one having skilled in the relevant art given the description herein, the three-dimensional depth map is an image that contains data relating to the distance of the surfaces of objects, such as the scene surface, from a viewpoint of the location of camera assembly 106. A pixel located in a digital photographic image correlates to a pixel represented in the three-dimensional depth map. The depth map shows luminance in proportion to the distance from the camera. For example, the depth map represents a color scale for the pixels represented in the depth map. Pixels located a further distance from camera assembly 106 may have a darker shade of color than pixels represented in the depth map located a closer distance from camera assembly 106. Pixels located a closer distance from camera assembly 106 may have a lighter shade of color than pixels represented in the depth map located a further distance from camera assembly 106.

Three-Dimensional Depth Map Generation

Figure 4:
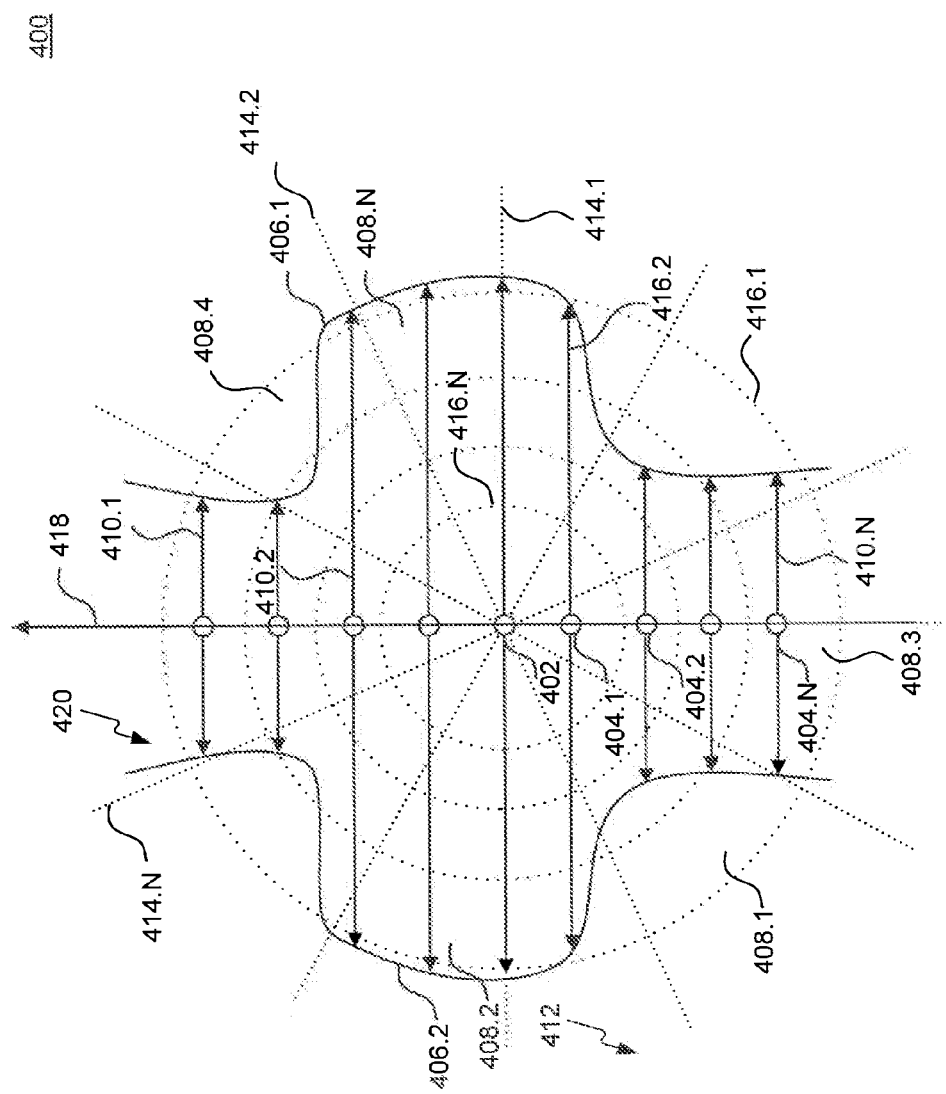
FIG. 4 depicts a three-dimensional depth map generation configuration in which embodiments of the present disclosure, or portions thereof, may be implemented.

FIG. 4 depicts a three-dimensional depth map generation configuration 400. Three-dimensional depth map generation configuration 400 includes a panoramic image location 402, a plurality of scene surface measurement locations 404.1 through 404.N, scene surfaces 406.1 and 406.2, a plurality of voxels 408.1 through 408.N, a plurality of scene surface scan lines 410.1 through 410.N, an external scene surface location 412, an internal scene surface location 420, a plurality of spherical coordinate radii 414.1 through 414.N, a plurality of spherical coordinate azimuths 416.1 through 416.N, and a camera assembly path 418.

As noted above, the effect of parallax may be accounted for based on the distance data provided by plurality of scanners 102.1 through 102.N. Specifically, the distance data obtained by plurality of scanners 102.1 through 102.N may be used to generate the three-dimensional depth map. The three-dimensional depth map may be used to spatially shift pixels in panorama so that each pixel may be properly mapped from each digital photographic image onto the panoramic image to minimize the effect of parallax. The three-dimensional depth map may be generated in embodiments discussed below.

The three-dimensional depth map may represent the estimated distance from each camera 104.1 through 104.N to scene surfaces 406.1 and 406.2. As noted above, camera assembly 106 may travel along camera assembly path 418, where at various points along camera assembly path 418, plurality of cameras 104.1 through 104.N capture the panoramic image. The distance may be estimated from the camera assembly 106 to scene surfaces 406.1 and 406.2 at each image capture point along camera assembly path 418. For example, panoramic image location 402 may represent a location where cameras 104 capture a panoramic image. This estimation is discussed in more detail below.

In an embodiment, plurality of scanners 102.1 through 102.N measure the distance between camera assembly 106 and scene surfaces 406. Plurality of scanners 102 may measure the distance between camera assembly 106 and scene surfaces 406 when cameras 104 capture the panoramic image. For example, plurality of scanners 102.1 through 102.N may measure the distance between camera assembly 106 and scene surfaces 406 at panoramic image location 402. Plurality of scanners 102.1 through 102.N may also measure the distance from camera assembly 106 to scene surfaces 406.1 and 406.2 at various other locations along camera assembly path 418 such as locations 404.1 through 404.N.

Plurality of scanners 102.1 through 102.N may measure the distance between camera assembly 106 and scene surfaces 406 by generating a plurality of scan lines. For example, plurality of scanners 102.1 through 102.N may generate plurality of scene surface scan lines 410.1 through 410.N. Each scene surface scan line 410 generated by scanners 102 may represent the distance from camera assembly 106 to scene surfaces 406.

In an embodiment, each scene surface scan line 410.1 through 410.N is converted to a spherical coordinate system centered at the location where the panoramic image is taken, such as at panoramic image location 402. Each scene surface scan line 410 may be projected onto the spherical coordinate system centered at panoramic image location 402 based on the distance of each scene surface scan line 410 measured by plurality of scanners 102.

In an embodiment, the spherical coordinate system centered at panoramic image location 402 is generated by voxelization. As would be appreciated by those skilled in the art, voxelization is the process of converting a geometric representation of a synthetic three-dimensional model into a set of voxels that represent the synthetic model within the discrete voxel space. As a result, the spherical coordinate system centered at panoramic image location 402 may be partitioned into voxels, where each voxel is formed by the intersection of surfaces of constant radius, constant elevation, and constant azimuth. For example as shown in FIG. 4, plurality of voxels 408.1 through 408.N are generated by the intersection of plurality of spherical coordinate radii 414.1 through 414.N, spherical coordinate azimuths 416.1 through 416.N, and a plurality of elevations (not shown). Specifically, voxel 408.N is generated by the intersection of plurality of spherical coordinate radii 414.1 and 414.2 with plurality of azimuths 416.1 and 416.2 and with a plurality of elevations (not shown).

Each pixel in a panoramic image centered at camera assembly 402 may be represented in the spherical coordinate system by a line of voxels. As shown in FIG. 4, lines of voxels appear to radiate outward towards scene surfaces 406.1 and 406.2 from panoramic image location 402.

The voxelization of the spherical coordinate system centered at panoramic image location 402 may include voxels from plurality of voxels 408.1 through 408.N that may be located in an internal region to scene surfaces 406.1 and 406.2 and voxels that may be located in an external region to scene surfaces 406.1 and 406.2. The internal region to scene surfaces 406.1 and 406.2 may be defined by the internal scene surface location 420 that encompasses the region between scene surfaces 406.1 and 406.2. The external region of scene surfaces 406.1 and 406.2 may be defined by external scene surface location 412 as the region that encompasses the region not shared by scene surfaces 406.1 and 406.2.

In an embodiment, the distance of panoramic image location 402 to scene surfaces 406.1 and 406.2 may be estimated based on the location of each voxel in relation to scene surfaces 406.1 and 406.2. Each voxel may be classified as located in internal scene surface location 420 or located in external scene surface location 412. For example, voxel 408.1 may be classified as located in external scene surface location 412. In another example, voxel 408.N may be classified as located in internal scene surface location 420. Each voxel that is located in internal scene surface location 420 may be marked as such. Each voxel that is located in external scene surface location 412 may be marked as such. The classification of each voxel may be determined by applying a random field model to each voxel. The random field model may include Markov random field, Markov network, undirected graphical model, Bayesian network, Gibbs random field, Isling model, and any other random fill model that will be apparent to those skilled in the relevant art(s) without departing from the spirit and scope of the present invention.

After each voxel has been classified, a boundary between voxels that are marked as located in the internal region and voxels that are marked as located in the external region may be identified. The scene surface then lies on the boundary between voxels in external and internal regions. For example, the voxel boundary may be defined based on the boundary between voxel 408.1 and voxel 408.3. Voxel 408.1 is classified as located in external scene surface location 412 and is marked as such. Voxel 408.3 is classified as located in internal scene surface location 420 and is marked as such. Voxels 408.1 and 408.3 are located adjacent to each other but yet have different classifications regarding each of their respective locations relative to scene surface 406.1. As a result, the voxel boundary is between voxels 408.1 and 408.3.

Specifically, each pixel that corresponds to first voxel 408 located in external scene surface location 412 in a line of voxels that radiate from panoramic image location 402 may be identified as located along the scene surface. The location of first voxel 408 in external scene surface location 412 in the three-dimensional domain may be an estimate of the location of the pixel located along scene surface 406 in the two-dimensional domain. The estimate of the location of the pixel located along scene surfaces 406 may be the estimated depth value of the pixel. The estimated depth value for the pixel is from panoramic image location 402 along the line of voxels radiating outward towards scene surfaces 406 to first voxel 408 located in external scene surface location 412. For example, the location of voxel 408.1 is the first voxel located in external scene surface location 412 along the line of voxels that radiate from panoramic image location 402 to voxel 408.1. The pixel in the two-dimensional domain that corresponds to voxel 408.1 in the three-dimensional domain may be identified as located along scene surface 406.2. The distance of the voxel 408.1 from the panoramic center 402 gives the estimated depth value of the pixel that corresponds to voxel 408.1.

In another embodiment, an estimated depth value for each pixel that corresponds to each voxel 408 may be determined. The estimated depth value for each pixel may be discretized into a finite quantity of possible depth values. For example, a finite quantity of depth values may include but is not limited to 1 foot, 2 feet, 3 feet, 4 feet, and 5 feet. In an embodiment, each pixel may be assigned the estimated depth value based on optimization techniques include Markov random field, Markov network, undirected graphical model, Bayesian network, Gibbs random field, Isling model, and any other optimization technique that will be apparent to those skilled in the relevant art(s) without departing from the spirit and scope of the present invention.

Each pixel along scene surfaces 406 may be labeled with one of the depth values from the finite quantity of possible depth values. Once each pixel located along scene surfaces 406 is assigned a depth value label from the finite quantity of possible depth values, then a depth map is generated based on the assigned depth value label for each pixel. For example, the pixel located along the line of voxels radiating from panoramic image location 402 to first voxel 408.1 located in external scene surface location 412 may be assigned a depth value label of 3 feet. The pixel located along the line of voxels radiating from panoramic image center 402 to first voxel 408.N located in external surface location 412 may be assigned a depth value label of 4 feet. The depth map for the scene may be generated based on the depth value label assigned to each pixel located along the scene surfaces 406. As noted above, the three-dimensional depth map may be used to spatially shift pixels so that each pixel is properly mapped from each digital photographic image onto the panoramic image to minimize the effect of parallax.

Panoramic Image Generation

Figure 5:
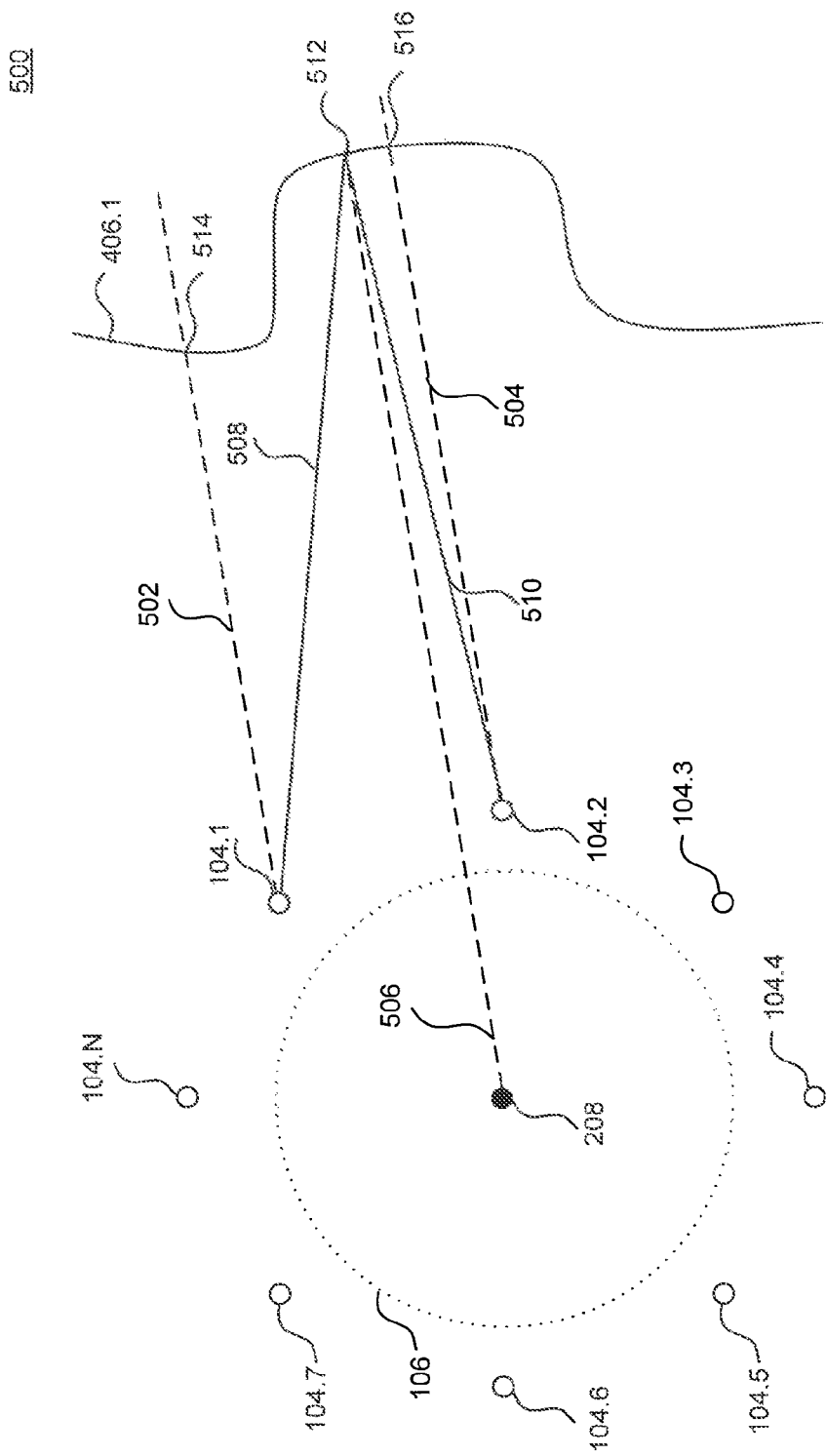
FIG. 5 depicts a depth map projection configuration in which embodiments of the present disclosure, or portions thereof, may be implemented.

FIG. 5 depicts a depth map projection configuration 500. Depth map projection configuration 500 includes plurality of cameras 104.1 through 104.N, camera assembly 106, camera assembly center 208, scene surface 406.1, first individual camera infinity projection 502, second individual camera infinity projection 504, camera center projection 506, first individual camera projection 508, second individual camera projection 510, and scene point 512.

As noted above, a lack of the single common center of projection for each camera 104.1 through 104.N may result in parallax error when the digital photographic images captured by plurality of cameras 104.1 through 104.N are stitched together to form the panoramic image of scene surface 406.1. For example, camera 104.1 captures scene point 512 when capturing digital photographic images of scene surface 406.1. Camera 104.2 also captures scene point 512 when capturing digital photographic images of scene surface 406.1.

However, the exact location of scene point 512 relative to camera 104.1 and camera 104.2 may be unknown without an accurate scene geometry. Scene point 512 is a three-dimensional point that is visible in a particular pixel at a certain distance from panoramic center 208. So, if the pixel has an inaccurate depth estimate, the location of scene point 512 likewise becomes inaccurate, also affecting the accuracy of camera projections 508 and 510. This may result in parallax when the panoramic image is generated.

As shown in FIG. 5, cameras 104.1 and 104.2 each capture scene point 512. Camera 104.1 captures scene point 512 with first individual camera projection 508 and camera 104.2 captures scene point 512 with second individual camera projection 510. The panoramic image is created by projecting rays in several different directions from camera assembly center 208 where each ray corresponds to a panoramic pixel included in the panoramic image. For example, camera center projection 506 corresponds to a panoramic pixel included in the panoramic image centered at camera assembly center 208. To get the value of the panoramic pixel located at camera assembly center 208, scene point 512 may be projected onto camera 104.1 with first individual camera projection 508 and camera 104.2 with second individual camera projection 510. The value of the panoramic pixel located at camera assembly center 208 may be obtained from the value of the pixel from camera 104.1 that corresponds to scene point 512 and from the value of the pixel from camera 104.2 that corresponds to scene point 512.

However, if the distance of the scene point along camera center projection 506 is not known, one would not be able to correctly project the scene point to cameras 104.1 and 104.2. For example, if one assumes that the scene point, instead of being at scene point 512, is at a very large distance along camera center projection 506 (e.g., at infinity), the projections on cameras 104.1 and 104.2 are represented by projections 502 and 504 instead of 508 and 510. In reality, these lines intersect the actual scene at points 514 and 516 instead of scene point 512, therefore giving inaccurate pixel values when generating the panoramic pixel.

As noted above, the depth map generated may provide the estimated distance of each ray of cameras 104.1 through 104.N that captures portions of scene surface 406.1. For example, the depth map may provide the lengths and relative directions of first individual camera projection 508 and second individual camera projection 510. The distance from camera assembly center 208 on camera assembly 106 to each of plurality of cameras 104.1 through 104.N may also be measured. For example, the distance and angle from camera assembly center 208 to plurality of cameras 104.1 through 104.N may be manually measured when positioning each of plurality of cameras 104.1 through 104.N on camera assembly 106. The distance from camera assembly center 208 to scene point 512 may be determined from the depthmap pixel corresponding to the direction of 506.

With the length and direction of camera center projection 506 determined, the pixel corresponding to scene point 512 may be accurately projected onto camera 104.1 and 104.2 with individual camera projection 508 and individual camera projection 510, respectively. The length and direction of camera center projection 506 may increase the likelihood that the pixel corresponding to scene point 512 may be projected onto camera 104.1 and 104.2 so that parallax may be minimized.

The value of the panoramic pixel included in the panoramic image centered at camera assembly center 208 may be obtained from the values of the pixels corresponding to scene point 512 projected onto camera 104.1 and 104.2. As a result, the panoramic pixel may also correspond to scene point 512. The panoramic pixel corresponding to scene point 512 may be mapped to the panoramic image centered at camera assembly center 208.

The digital photographic images captured by camera 104.1 and camera 104.2 that include the panoramic pixel corresponding to scene point 512 may be stitched together to create the panoramic image. The panoramic pixel corresponding to scene point 512 with the values of the pixels projected onto camera 104.1 and camera 104.2 may be spatially shifted to form the panoramic image with a spatial relationship uniform to each of the pixels when the digital photographic images are stitched together. As a result, the panoramic image of scene surface 406.1 may be of higher quality as compared to panoramic images with pixels that have not been projected as such.

The above discussion is referenced to scene point 512, which may be a known point. In an embodiment, the above discussion may also be implemented when scene point 512 is not known. Scene point 512 may not be known when a depth map has not been generated. In such an embodiment, scene point 512 as located in scene surface 406.1 may be assumed to be at infinity. In FIG. 5, the projection to infinity from camera 104.1 is represented by first individual camera infinity projection 502 and the projection to infinity from camera 104.2 is represented by second individual camera infinity projection 504. The estimated pixel location for first individual camera infinity projection 502 and the estimated pixel location for second individual camera infinity projection 504 may be determined from simplified scene geometry rules. Alternatively, one can assume groups of scene points to be in a ground plane, in a ceiling plane, in a middle plane, and/or any other type of simplified scene geometry that will be apparent to those skilled in the relevant art(s) without departing from the spirit and scope of the present invention. The above discussion may then incorporate the estimated pixel location for first individual camera projection 502 and second individual camera projection 504 to minimize parallax in the panoramic image.

In some embodiments, since the actual depth may not be known and a different depth may be used, parallax may not be completely eliminated, although it may be improved.

Scan Line Computing System

Figure 6:
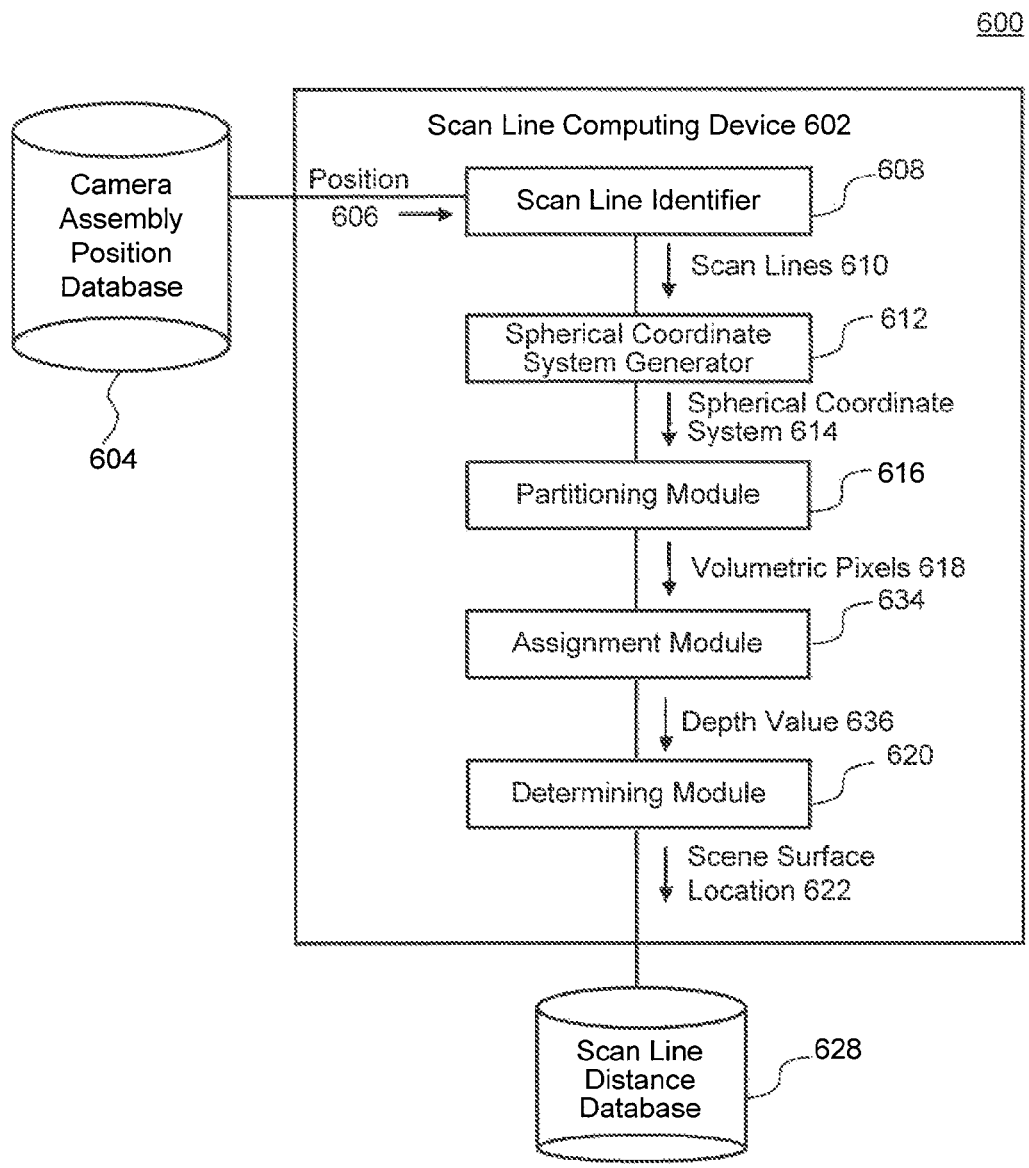
FIG. 6 is an example of a database system architecture in which embodiments of the present disclosure, or portions thereof, may be implemented.

FIG. 6 is an example of a database system architecture 600 in which embodiments of the present disclosure, or portions thereof, can be implemented. System architecture 600 includes scan line computing device 602 coupled to camera assembly position database 604. Scan line computing device 602 may also be coupled to scan line distance database 628. While the embodiment depicted in FIG. 6 shows scan line computing device 602 connected to camera assembly position database 604 and scan line distance database 628, it is important to note that embodiments can be used to exchange data between a variety of different types of computer implemented data sources, systems, and architectures, such as a networked cloud based architecture.

In some embodiments, scan line computing device 602 operates as follows. Camera assembly position database 604 supplies a position 606 of a center of projection positioned on a camera assembly as the camera assembly travels along a travel path. As the camera assembly travels along the travel path, a position identifier, such as a navigation device, located on the camera assembly provides each position 606 of the camera assembly to camera assembly position database 604. Example navigation devices include a global positioning system (GPS), an inertial measurement unit (IMU), a wheel encoder and/or any other position identifier that will be apparent to those skilled in the relevant art(s) without departing from the spirit and scope of the present invention.

Scan line identifier 608 receives position 606 from camera assembly position database 604. In an embodiment, scan line identifier 608 provides scan lines 610 that correspond to each position 606 of each center of projection as the camera assembly is travelling along the travel path. Each scan line 610 has a distance from position 606 to a position of each pixel corresponding to a scene point on a scene surface.

Spherical coordinate system generator 612 generates a spherical coordinate system 614 that is centered at a panoramic center of projection for a panoramic image where spherical coordinate system 614 extends beyond the scene surface. Each scan line 610 may be converted to spherical coordinate system 614. For example, the center of projection for the panoramic image is at position 606. Spherical coordinate system generator 612 generates spherical coordinate system 614 centered at position 606 with each scan line 610 converted to spherical coordinate system 614.

Partitioning module 616 partitions spherical coordinate system 614 into volumetric pixels 618. In an embodiment assignment module 634 assigns depth value 636 to each panoramic pixel corresponding to volumetric pixels 618. Depth value 636 may be an estimated depth value for each pixel where depth value 636 may be selected from a finite quantity of possible depth values. Depth value 636 may be determined based on an optimization technique such as but not limited to a random field model. Determining module 620 module receives depth value 636 and determines scene surface location 622 based on depth value 636 assigned to each panoramic pixel corresponding to the scene surface.

Parallax Minimizing Computing System

Figure 7:
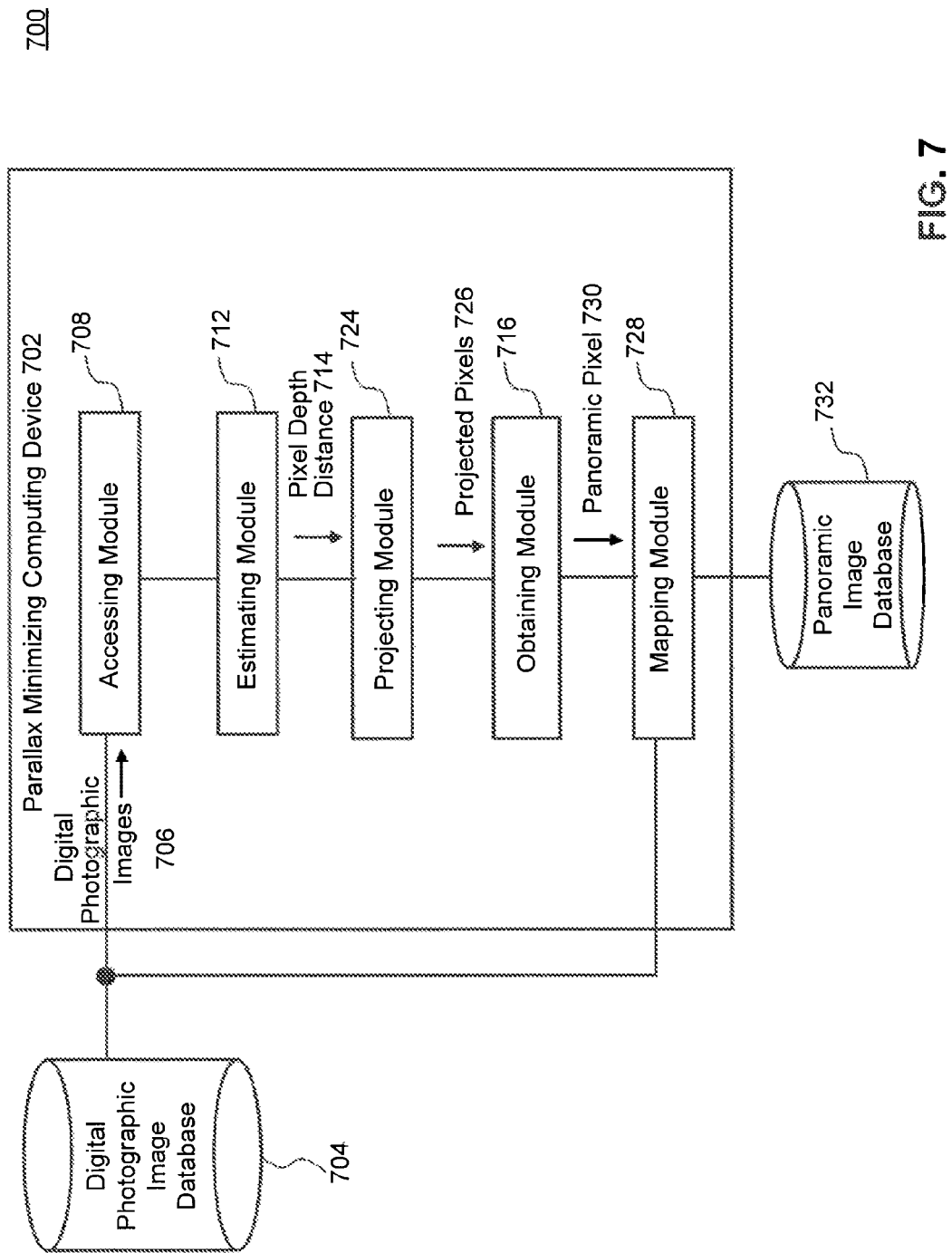
FIG. 7 is an example of a database system architecture in which embodiments of the present disclosure, or portions thereof, may be implemented.

FIG. 7 is an example of a database system architecture 700 in which embodiments of the present disclosure, or portions thereof, can be implemented. System architecture 700 includes parallax minimizing computing device 702 coupled to digital photographic image database 704. Parallax minimizing computing device 702 may also be coupled to panoramic image database 732. While the embodiment depicted in FIG. 7 shows parallax minimizing computing device 702 connected to digital photographic image database 704 and panoramic image database 732, it is important to note that embodiments can be used to exchange data between a variety of different types of computer implemented data sources, systems, and architectures, such as a networked cloud based architecture.

In some embodiments, parallax minimizing computing device 702 operates as follows. Digital photographic image database 704 supplies digital photographic images 706. Digital photographic images 706 depict the captured scene. Digital photographic images 706 may be captured by cameras positioned on a camera assembly as the camera assembly travels along a travel path.

Accessing module 708 accesses digital photographic images 706 from digital photographic image database 704, where digital photographic images 706 are configured to be merged to form the panoramic image. Estimating module 712 estimates pixel depth distance 714. Pixel depth distance 714 may be the distance of a pixel that corresponds to a scene point on the scene surface to a panoramic center of projection that is positioned on the camera assembly as the camera assembly travels along a travel path.

Projecting module 724 may use pixel depth distance 714 to place (e.g., back-project) each panoramic pixel 730 onto a three-dimensional point. Projecting module 724 may project the three-dimensional point onto each camera that captured digital photographic images 706 based on pixel depth distance 714. Obtaining module 716 obtains panoramic pixel 722 from each projected pixel 726 projected onto each camera. Obtaining module 716 generates panoramic pixel 722 based on the value of each projected pixel 726 projected onto each camera.

In an embodiment, mapping module 728 maps mapped panoramic pixel 730 onto the panoramic image. Mapping module 728 maps panoramic pixel 730 from each respective projected pixel 726 projected onto each camera onto the panoramic image to generate panoramic pixel 730. Panoramic pixel 730 has a common center of projection based on the center of projection from each camera located on the camera assembly. The common center of projection minimizes parallax that is generated when digital photographic images 706 are stitched together to form the panoramic image. Mapping module 728 provides panoramic pixel 730 in the panoramic image stored in panoramic image database 732.

As referred to herein, a module can be any type of processing (or computing) device having one or more processors. For example, a module can be a workstation, mobile device, computer, cluster of computers, set-top box, or other devices having at least one processor. In an embodiment, multiple modules can be implemented on the same processing device. Such a processing device can include software, firmware, hardware, or a combination thereof. Software can include one or more applications and an operating system. Hardware can include, for example but not limited to, a processor, memory, and/or graphical user interface display.

Scan Line Estimation Method

Figure 8:
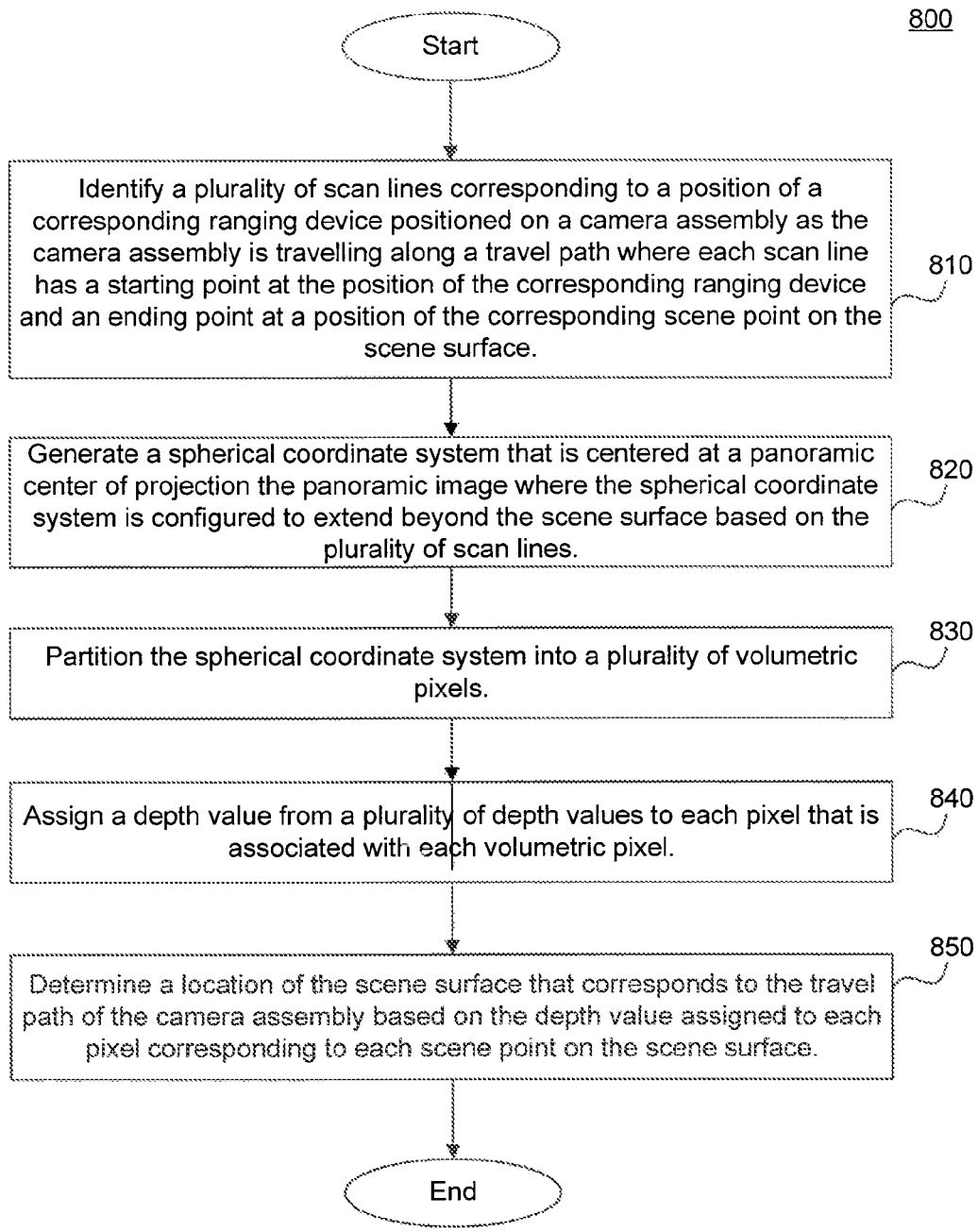
FIG. 8 is a flowchart showing an example method for estimating a scene surface based on a scan line distance from each ranging device positioned on a camera assembly.

FIG. 8 is a flowchart showing an example method 800 for estimating a depth of each pixel corresponding to a scene point on a scene surface. As shown in FIG. 8, method 800 begins at stage 810, when a plurality of scan lines corresponding to a position of a corresponding ranging device positioned on a camera assembly is identified as the camera assembly travels along a travel path. Each scan line has a starting point at the position of the corresponding ranging device and an end point at a position of the corresponding scene point on the scene surface. For example, as shown in FIG. 4, a plurality of scan lines 410.1 through 410.N is identified that correspond to a plurality of scene surface measurement locations 404.1 through 404.N as the camera assembly travels along camera assembly path 418. Each scene surface scan line 410.1 through 410.N has a starting point at each corresponding scene surface measurement location 404.1 through 404.N and an end point at the position of the corresponding scene point on scene surfaces 406.1 and 406.2.

At stage 820, a spherical coordinate system is generated that is centered at the panoramic center of projection of the panoramic image where the spherical coordinate system is configured to extend beyond the scene surface based on the plurality of scan lines. For example, as shown in FIG. 4, a spherical coordinate system is generated that is centered at panoramic image location 402 where the spherical coordinate system is configured to extend beyond scene surfaces 406.1 and 406.2.

At stage 830, the spherical coordinate system is partitioned into a plurality of volumetric pixels ("voxels"). For example, as shown in FIG. 4, the spherical coordinate system is partitioned into a plurality of voxels 408.1 through 408.N.

At stage 840, a depth value from a plurality of depth values is assigned to each pixel that is associated with each volumetric pixel. For example, as shown in FIG. 4, voxel 408.1 may be assigned a depth value of 2 feet.

At stage 850, a location of the scene surface is determined that corresponds to the travel path of the camera assembly based on the depth value assigned to each pixel corresponding to each scene point on the scene surface. For example, as shown in FIG. 4, a location of scene surface 406.1 is determined based on the depth value assigned to each pixel corresponding to each scene point on scene surface 406.1. When stage 850 is complete, method 800 ends.

Parallax Minimization Method

Figure 9:
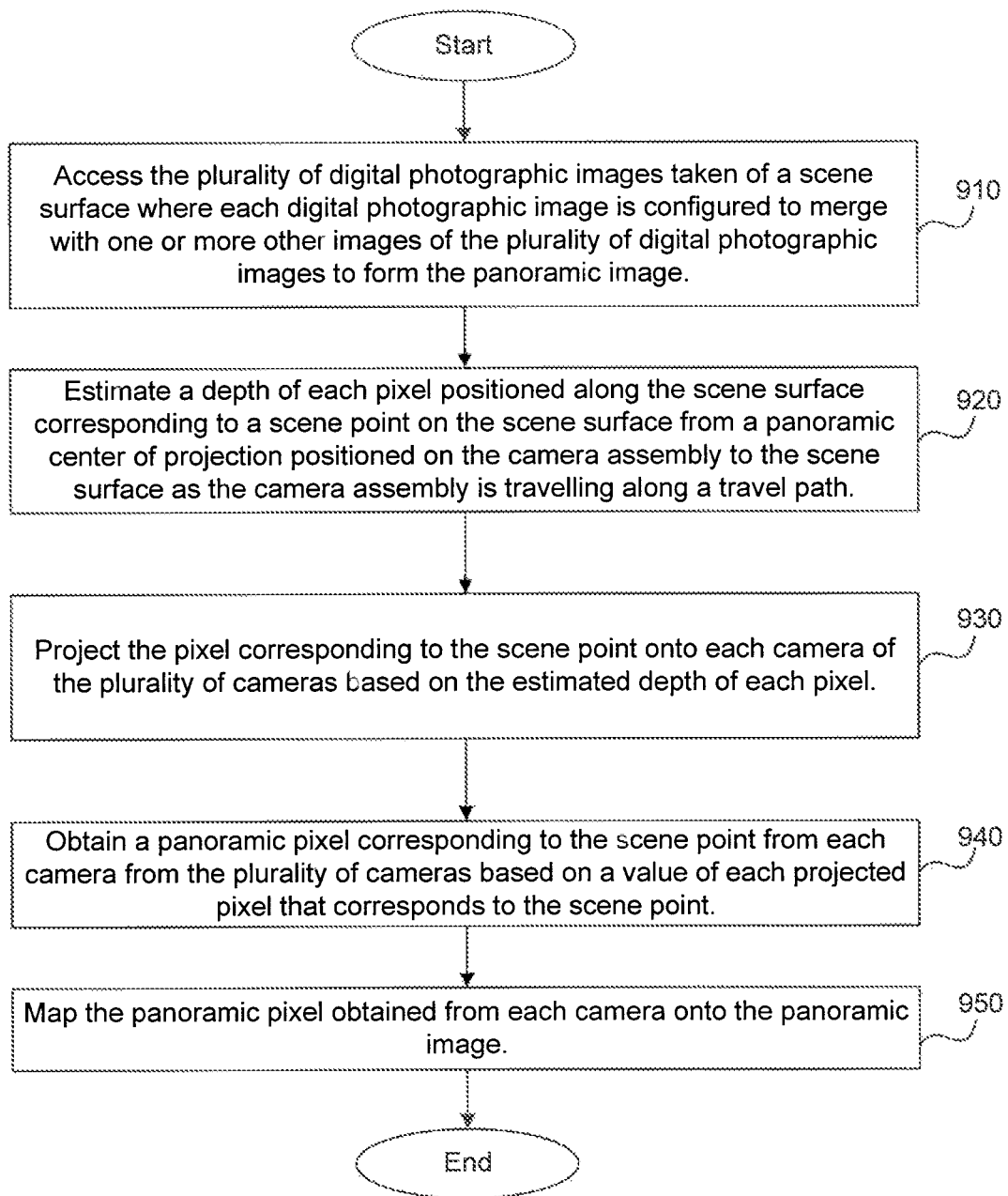
FIG. 9 is a flowchart showing an example method for minimizing parallax from a panoramic image created by stitching together a plurality of digital photographic images captured from a plurality of cameras positioned on a camera assembly.

FIG. 9 is a flowchart showing an example method 900 for minimizing parallax from a panoramic image created by stitching together a plurality of digital photographic images captured from a plurality of cameras positioned on a camera assembly. As shown in FIG. 9, method 900 begins at stage 910, when the plurality of digital photographic images taken of a scene surface is accessed.

At stage 920, an individual camera projection distance is estimated from the depth of each pixel corresponding to a scene point on the scene surface from a panoramic center of projection positioned on the camera assembly to the scene surface as the camera assembly is travelling along a travel path. For example, as shown in FIG. 5, camera center projection 506 is estimated from camera assembly center 208 to scene surface 406.1 as camera assembly 106 is travelling along a travel path.

At stage 930, the pixel corresponding to a scene point is projected onto each camera of the plurality of cameras based on the estimated depth of each pixel. For example, as shown in FIG. 5, the pixel corresponding to scene point 512 is projected onto camera 104.1 with first individual camera projection 508 based on the estimated depth of the pixel. The pixel corresponding to scene point 512 is also projected onto camera 104.2 with second individual camera projection 510 based on the estimated depth of the pixel.

At stage 940, a panoramic pixel corresponding to the scene point may be obtained based on a value of each projected pixel that corresponds to the scene point that is projected onto each camera. For example, as shown in FIG. 5, a panoramic pixel corresponding to scene point 512 may be generated based on the value of the pixel corresponding to scene point 512 that is projected onto camera 104.1 and the value of the pixel corresponding to scene point 512 that is projected onto camera 104.2.

At stage 950, the panoramic pixel obtained from each camera is mapped onto the panoramic image. For example, as shown in FIG. 5, the panoramic pixel corresponding to scene point 512 obtained from cameras 104.1 and 104.2 is mapped onto the panoramic image. When stage 950 is complete, method 900 ends.

Exemplary Computer System

Figure 10:
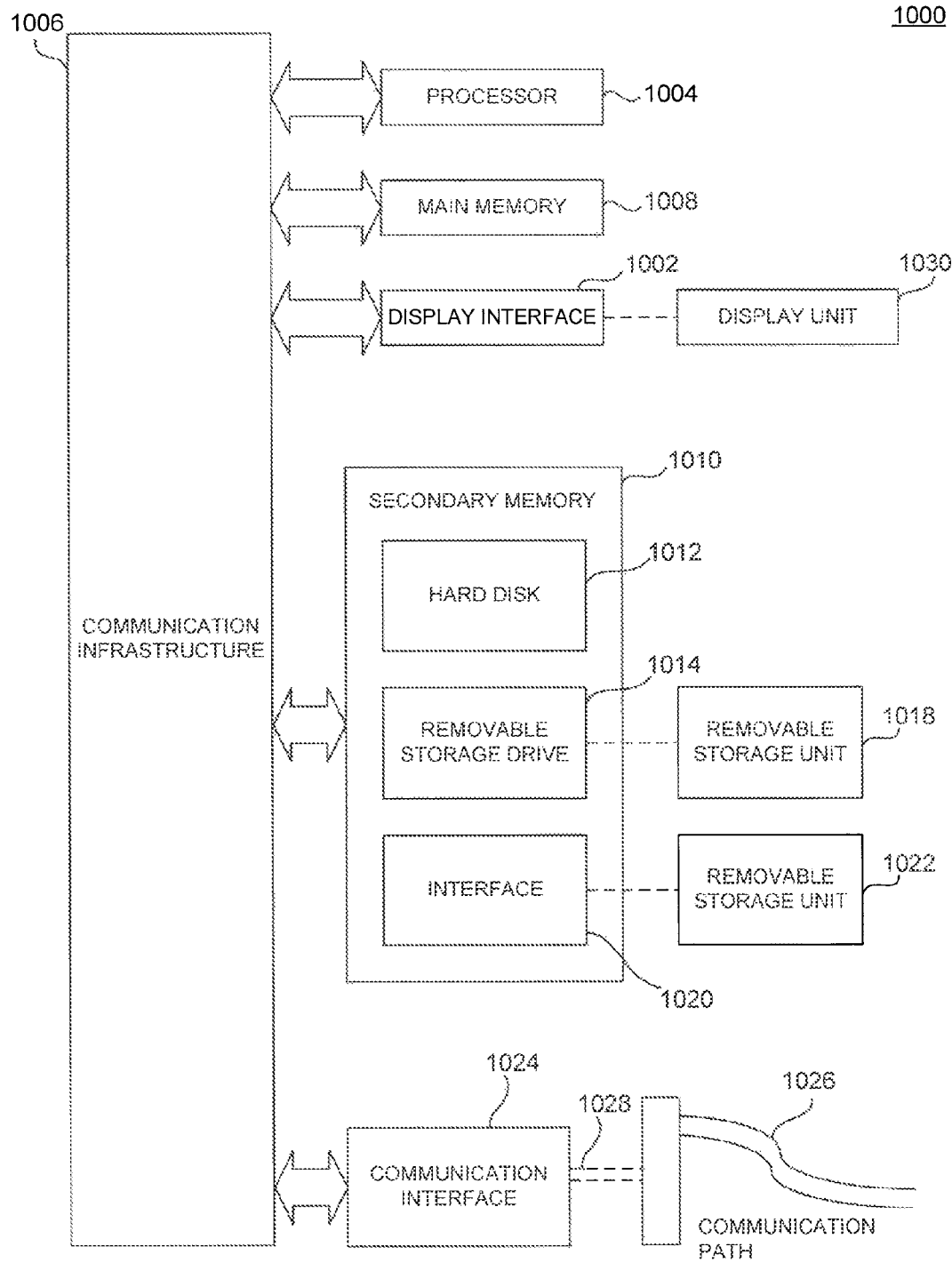
FIG. 10 depicts an example computer system in which embodiments of the present invention, or portions thereof, may be implemented as computer-readable code.

FIG. 10 illustrates an example computer system 1000 in which embodiments of the present invention, or portions thereof, may be implemented as computer-readable code. For example, portions of system 600, system 700, method 800 and method 900 may be implemented in computer system 1000 using hardware, software, firmware, tangible computer readable media having instructions stored thereon, or a combination thereof and may be implemented in one or more computer systems or other processing systems.

If programmable logic is used, such logic may execute on a commercially available processing platform or a special purpose device. One of ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device.

For instance, a computing device having at least one processor device and a memory may be used to implement the above described embodiments. A processor device may be a single processor, a plurality of processors, or combinations thereof. Processor devices may have one or more processor "cores."

Various embodiments of the invention are described in terms of this example computer system 1000. After reading this description, it will become apparent to a person skilled in the relevant art how to implement the invention using other computer systems and/or computer architectures. Although operations may be described as a sequential process, some of the operations may in fact be performed in parallel, concurrently, and/or in a distributed environment, and with program code stored locally or remotely for access by single or multiprocessor machines. In addition, in some embodiments the order of operations may be rearranged without departing from the spirit of the disclosed subject matter.

As will be appreciated by persons skilled in the relevant art, processor device 1004 may be a single processor in a multi-core/multiprocessor system, such system operating alone, or in a cluster of computing devices operating in a cluster or server farm. Processor device 1004 is connected to a communication infrastructure 1006, for example, a bus, message queue, network, or multi-core message-passing scheme.

Computer system 1000 also includes a main memory 1008, for example, random access memory (RAM), and may also include a secondary memory 1010. Secondary memory 1010 may include, for example, a hard disk drive 1012, removable storage drive 1014. Removable storage drive 1014 may include a floppy disk drive, a magnetic tape drive, an optical disk drive, a flash memory, or the like. The removable storage drive 1014 reads from and/or writes to a removable storage unit 1018 in a well-known manner. Removable storage unit 1018 may include a floppy disk, magnetic tape, optical disk, etc. which is read by and written to by removable storage drive 1014. As will be appreciated by persons skilled in the relevant art, removable storage unit 1018 includes a computer usable storage medium having stored therein computer software and/or data.

In alternative implementations, secondary memory 1010 may include other similar means for allowing computer programs or other instructions to be loaded into computer system 1000. Such means may include, for example, a removable storage unit 1022 and an interface 1020. Examples of such means may include a program cartridge and cartridge interface (such as that found in video game devices), a removable memory chip (such as an EPROM, or PROM) and associated socket, and other removable storage units 1022 and interfaces 1020 which allow software and data to be transferred from the removable storage unit 1022 to computer system 1000.

Computer system 1000 may also include a communications interface 1024. Communications interface 1024 allows software and data to be transferred between computer system 1000 and external devices. Communications interface 1024 may include a modem, a network interface (such as an Ethernet card), a communications port, a PCMCIA slot and card, or the like. Software and data transferred via communications interface 1024 may be in the form of signals, which may be electronic, electromagnetic, optical, or other signals capable of being received by communications interface 1024. These signals may be provided to communications interface 1024 via a communications path 1026.

In this document, the terms "computer program storage medium" and "computer usable storage medium" are used to generally refer to storage media such as removable storage unit 1018, removable storage unit 1022, and a hard disk installed in hard disk drive 1012. Computer program storage medium and computer usable storage medium may also refer to memories, such as main memory 1008 and secondary memory 1010, which may be memory semiconductors (e.g. DRAMs, etc.).

Computer programs (also called computer control logic) are stored in main memory 1008 and/or secondary memory 1010. Computer programs may also be received via communications interface 1024. Such computer programs, when executed, enable computer system 1000 to implement the present invention as discussed herein. In particular, the computer programs, when executed, enable processor device 1004 to implement the processes of the present invention, such as some stages in the method illustrated by flowchart 800 of FIG. 8 and flowchart 900 of FIG. 9 discussed above. Accordingly, such computer programs represent controllers of the computer system 1000. Where an embodiment is implemented using software, the software may be stored in a computer program product and loaded into computer system 1000 using removable storage drive 1014, interface 1020, and hard disk drive 1012, or communications interface 1024.

CONCLUSION

The Brief Summary and Abstract sections may set forth one or more but not all example embodiments and thus are not intended to limit the scope of the present disclosure and the appended claims in any way.

Embodiments have been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

The foregoing description of specific embodiments will so fully reveal the general nature of the disclosure that others may, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present disclosure should not be limited by any of the above-described example embodiments, but should be defined only in accordance with the following claims and their equivalents.

What is claimed is:

1. A method for estimating a depth of each pixel corresponding to a scene point on a scene surface, comprising:
    identifying, by a processing device, a plurality of scan lines corresponding to a position of a corresponding ranging device positioned on a camera assembly as the camera assembly is travelling along a travel path, wherein each scan line has a starting point at the position of the corresponding ranging device and an end point at a position of the corresponding scene point on the scene surface;
    generating, by the processing device, a spherical coordinate system that is centered at a panoramic center of projection for the panoramic image, wherein the spherical coordinate system is configured to extend beyond the scene surface based on the plurality of scan lines;
    partitioning, by the processing device, the spherical coordinate system into a plurality of volumetric pixels;
    assigning, by the processing device, a depth value from a plurality of depth values to each pixel that is associated with each volumetric pixel; and
    determining, by the processing device, a location of the scene surface corresponding to the travel path of the camera assembly based on the depth value assigned to each pixel corresponding to each scene point on the scene surface.

2. The method of claim 1, further comprising:
    generating a depth map based on the scan line distance for each scan line, wherein the depth map is configured to provide distance data along the scene surface relative to the travel path of the camera assembly.

3. The method of claim 1, further comprising:
    surveying each volumetric pixel to determine whether each volumetric pixel is located in an internal region or an external region, wherein the internal region is located internal to the scene surface and the external region is located external to the scene surface.

4. The method of claim 3, further comprising:
    identifying a first outside volumetric pixel located along a line of volumetric pixels radiating outward towards the scene surface from the position of the corresponding ranging device that is a first volumetric pixel along the line of volumetric pixels that is located outside the scene surface.

5. The method of claim 1, wherein the assigning comprises:
assigning a depth value to each pixel that corresponds to each volumetric pixel that is from an identified finite quantity of depth values.

6. The method of claim 1, wherein the identifying comprises:
receiving the plurality of scan lines from a plurality of lasers, wherein each laser is positioned on the camera assembly, wherein the position of each laser with respect to each camera positioned on the camera assembly is a known value.

7. A method for minimizing parallax from a panoramic image created by stitching together a plurality of digital photographic images captured from a plurality of cameras positioned on a camera assembly, comprising:
accessing, by a processing device, the plurality of digital photographic images taken of a scene surface, wherein each digital photographic image is configured to be merged with one or more other images of the plurality of digital photographic images to form the panoramic image;
estimating, by the processing device, a depth of each pixel corresponding to a scene point on the scene surface from a panoramic center of projection positioned on the camera assembly to the scene surface as the camera assembly is travelling along a travel path;
projecting, by the processing device, the pixel corresponding to the scene point onto each camera of the plurality of cameras based on the estimated depth of each pixel;
obtaining, by the processing device, a panoramic pixel corresponding to the scene point from each camera from the plurality of cameras based on a value of each projected pixel that corresponds to the scene point; and
mapping, by the processing device, the panoramic pixel obtained from each camera onto the panoramic image.

8. The method of claim 7, further comprising:
stitching the plurality of digital photographic images together to generate the panoramic image of the scene surface.

9. The method of claim 7, wherein the estimating comprises:
deriving the depth of each pixel corresponding to the scene point on the scene surface from a depth map.

10. The method of claim 7, wherein the obtaining comprises:
combining each value of each projected pixel that corresponds to the scene point to obtain the panoramic pixel corresponding to the scene point.

11. A system for estimating a depth of each pixel corresponding to a scene point on a scene surface, comprising:
a scan line identifier that is configured to provide a plurality of scan lines corresponding to a position of a corresponding ranging device positioned on a camera assembly as the camera assembly is travelling along a travel path, wherein each scan line has a starting point at the position of the corresponding ranging device and an end point at a position of the corresponding scene point on the scene surface;
a spherical coordinate system generator that is configured to generate a spherical coordinate system that is centered at a panoramic center of projection for the panoramic image, wherein the spherical coordinate system is configured to extend beyond the scene surface based on the plurality of scan lines;
a partitioning module that is configured to partition the spherical coordinate system into a plurality of volumetric pixels;
an assignment module that is configured to assign a depth value from a plurality of depth values to each pixel that is associated with each volumetric pixel; and
a determining module that is configured to determine a location of the scene surface corresponding to the travel path of the camera assembly based on the depth value assigned to each pixel corresponding to each scene point on the scene surface,
wherein each of the scan line identifier, the spherical coordinate system generator, the partitioning module, the assignment module, and the determining module are implemented on a processing device.

12. The system of claim 11, further comprising:
a depth map generator that is configured to generate a depth map based on the scan line distance for each scan line, wherein the depth map is configured to provide distance data along the scene surface relative to the travel path of the camera assembly.

13. The system of claim 11, further comprising:
a surveying module that is configured to survey each volumetric pixel to determine whether each volumetric pixel is located in an internal region or an external region, wherein the internal region is located internal to the scene surface and the external region is located external to the scene surface.

14. The system of claim 13, further comprising:
an identification module that is configured to identify a first outside volumetric pixel located along a line of volumetric pixels radiating outward towards the scene surface from the position of the corresponding ranging device that is a first volumetric pixel along the line of volumetric pixels that is located outside the scene surface.

15. The system of claim 11, wherein the assignment module is further configured to assign a depth value to each pixel that corresponds to each volumetric pixel from an identified quantity of finite depth values.

16. The system of claim 11, wherein the identifying module comprises:
a receiving module that is configured to receive the plurality of scan lines from a plurality of lasers, wherein each laser is positioned on the camera assembly, wherein the position of each laser with respect to each camera positioned on the camera assembly is a known value.

17. A system for minimizing parallax from a panoramic image created by stitching together a plurality of digital photographic images captured from a plurality of cameras positioned on a camera assembly, comprising:
an accessing module that is configured to access the plurality of digital photographic images taken of a scene surface, wherein each digital photographic image is configured to be merged with one or more other images of the plurality of digital photographic images to form the panoramic image;
an estimating module that is configured to estimate a depth of each pixel corresponding to a scene point on the scene surface from a panoramic center of projection positioned on the camera assembly to the scene surface as the camera assembly is travelling along a travel path;
a projecting module that is configured to project the pixel corresponding to the scene point onto each camera of the plurality of cameras based on the estimated depth of each pixel;
an obtaining module that is configured to obtain a panoramic pixel corresponding to the scene point from each camera from the plurality of cameras based on a value of each projected pixel that corresponds to the scene point; and a mapping module that is configured to map the panoramic pixel obtained from each camera onto the panoramic image, wherein the accessing module, the estimating module, the projecting module, the obtaining module, and the mapping module are implemented on a processing device.

18. The system of claim 17, further comprising:

a stitching module that is configured to stitch the plurality of digital photographic images together to generate the panoramic image of the scene surface.

19. The system of claim 17, wherein the estimating module is further configured to derive the depth of each pixel corresponding to the scene point on the scene surface from a depth map.

20. The system of claim 17, wherein the obtainment module is further configured to combine each value of each projected pixel that corresponds to the scene point to obtain the panoramic pixel corresponding to the scene point.

* * * * *